(12) United States Patent
Palanichamy

(10) Patent No.: US 10,970,638 B2
(45) Date of Patent: Apr. 6, 2021

(54) PERSONALLY IDENTIFIABLE INFORMATION IDENTIFICATION

(71) Applicant: American Express Travel Related Services Company, Inc., New York, NY (US)

(72) Inventor: Kayalvizhi Palanichamy, Seattle, WA (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 896 days.

(21) Appl. No.: 15/660,449

(22) Filed: Jul. 26, 2017

(65) Prior Publication Data
US 2019/0034808 A1    Jan. 31, 2019

(51) Int. Cl.
*G06N 5/02* (2006.01)
*G06F 21/62* (2013.01)
*G06N 5/04* (2006.01)
*G06Q 10/00* (2012.01)
*G06Q 10/10* (2012.01)
*G06Q 30/02* (2012.01)
*G06Q 30/06* (2012.01)

(52) U.S. Cl.
CPC ......... *G06N 5/022* (2013.01); *G06F 21/6245* (2013.01); *G06N 5/046* (2013.01); *G06Q 10/00* (2013.01); *G06Q 10/10* (2013.01); *G06Q 30/02* (2013.01); *G06Q 30/0201* (2013.01); *G06Q 30/06* (2013.01); *G06F 2221/2111* (2013.01)

(58) Field of Classification Search
None
See application file for complete search history.

(56) References Cited

U.S. PATENT DOCUMENTS

| 7,711,749 | B2* | 5/2010 | Brodie | G06F 16/367 707/783 |
| 9,235,728 | B2* | 1/2016 | Gottschalk, Jr. | G06Q 50/265 |
| 10,268,840 | B2* | 4/2019 | Lockhart, III | G06F 21/6263 |

* cited by examiner

*Primary Examiner* — Stanley K. Hill
(74) *Attorney, Agent, or Firm* — Thomas Elorstemeyer, LLP

(57) ABSTRACT

The system may be configured to perform operations including identifying, by a processor, personally identifiable information (PII) within a data model based on processing rules, to create identified PII, wherein the data model comprises entity information about an entity; comparing the identified PII with established PII in a standard data bank; validating the identified PII in response to the identified PII matching the established PII, to create validated PII; and marking the validated PII with a PII marker in response to the validating the identified PII.

17 Claims, 4 Drawing Sheets

PERSONALLY IDENTIFIABLE INFORMATION IDENTIFICATION

FIELD

The present disclosure generally relates to identifying personally identifiable information.

BACKGROUND

The handling and/or storing of personally identifiable information ("PII"), or information that is able to personally identify an entity (e.g., an individual or company), may pose a risk to those entities in possession of the PII and those entities to which the PII belongs. Therefore, in processing and identifying types of data and information stored within a repository, it may be necessary to identify which data comprises PII. Identifying PII allows the entity receiving, storing, and/or utilizing the PII to take appropriate measures to protect the PII (e.g., through encryption) in order to comply with certain requirements (e.g., HIPAA) or to reduce risk exposure posed by possible PII misappropriation.

SUMMARY

A system, method, and article of manufacture (collectively, "the system") are disclosed relating to PII identification. In various embodiments, the system may be configured to perform operations including identifying, by a processor, personally identifiable information (PII) within a data model based on processing rules, to create identified PII, wherein the data model may comprise entity information about an entity; comparing, by the processor, the identified PII with established PII in a standard data bank; validating, by the processor, the identified PII in response to the identified PII matching the established PII, to create validated PII; and/or marking, by the processor, the validated PII with a PII marker in response to the validating the identified PII.

In various embodiments, the operations may further comprise identifying, by the processor, an inventory identifier associated with each piece of PII of the validated PII, and identifying, by the processor, the entity associated with the inventory identifier. In various embodiments, the operations may further comprise detecting, by the processor, that the identified PII is different than the established PII, to create differing PII; adding, by the processor, the differing PII to the standard data bank; and/or associating, by the processor, the differing PII with the established PII. In various embodiments, the operations may further comprise identifying, by the processor, a physical location associated with the entity in the physical data model. In various embodiments, the operations may further comprise determining, by the processor, which pieces of the validated PII are the primary PII and which pieces of the information are the secondary PII.

In various embodiments, the data model may comprise at least one of a physical data model or a logical data model, wherein the physical data model may comprise the entity information and storage information describing how the entity information is stored and in what location, and the logical data model may comprise relational information describing an interaction and a relationship between pieces of entity information within the entity information. In various embodiments, the standard data bank may comprise primary PII and secondary PII within the established PII, wherein primary PII may comprise unique information associated with the entity, and secondary PII may comprise corroborative information associated with the entity.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
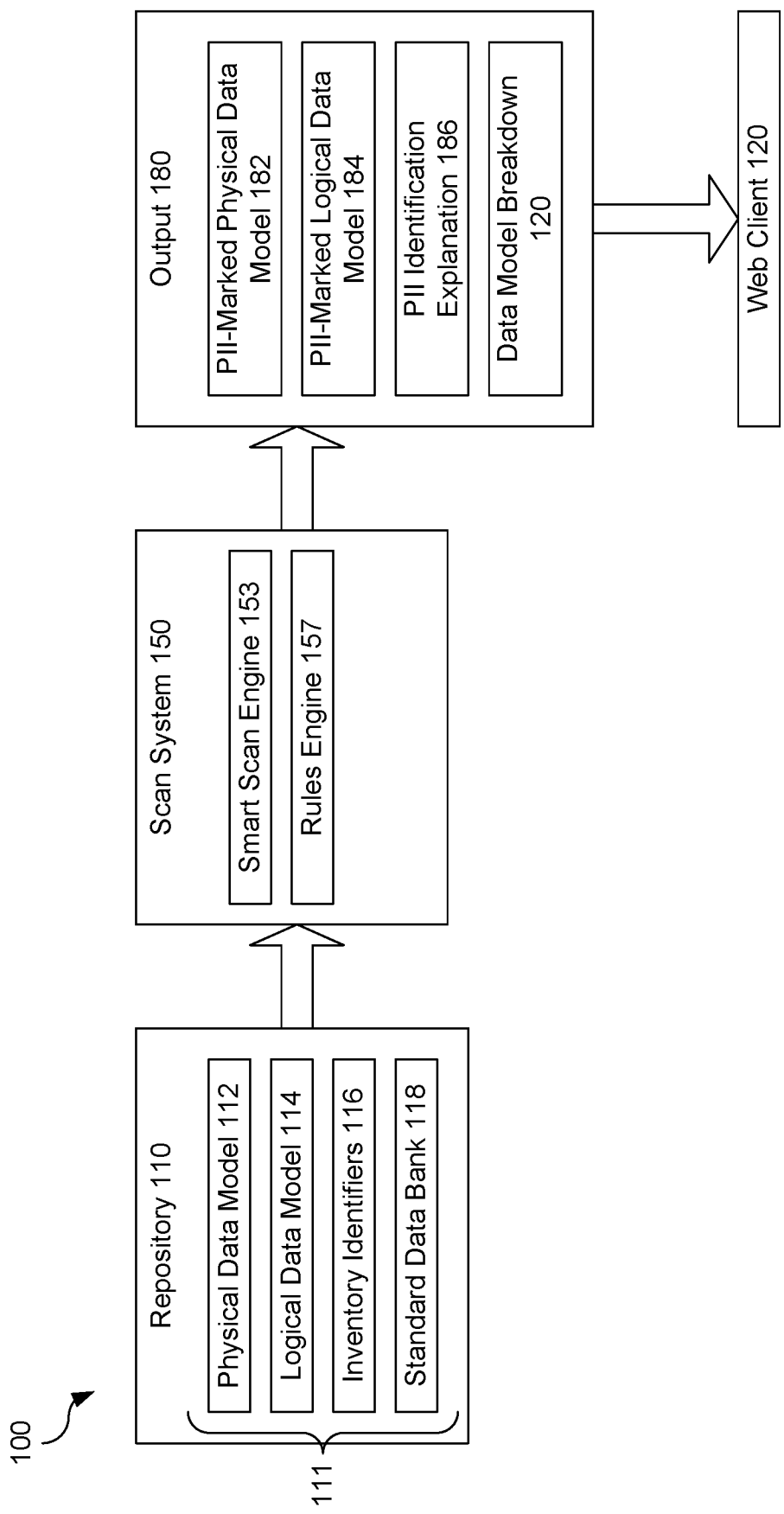
FIG. 1 shows an exemplary PII identification system, in accordance with various embodiments.

With reference to FIG. 1, in accordance with various embodiments, an exemplary PII identification system 100 may comprise a repository 110, a scan system 150, an output 180, and/or a web client 120. In various embodiments, any or all of the components of system 100 may be in electronic communication with one another. System 100, in operation, may have the capability to receive data from repositories and/or databases, such as various inputs 111 from repository 110, and identify, via scan system 150, PII comprised in inputs 111. System 100 may be able to scan large amounts of data (e.g., data belonging to hundreds or thousands of entities, comprising thousands of informational attributes/characteristics associated with the entities) to identify PII. Additionally, as further explained herein, scan system 150 of system 100 may be able to scan data models, as a whole, associated with entities looking for PII, rather than scanning simply individual pieces of data associated with an entity. Such a process increases the efficiency of identifying PII by orders of magnitude, thereby allowing greater efficiency and risk reduction relating the storage and/or use of PII. System 100 and/or scan system 150 may be computer-based, and may comprise a processor, a tangible non-transitory computer-readable memory, and/or a network interface. Instructions stored on the tangible non-transitory memory may allow system 100 and/or scan system 150 to perform various functions, as described herein.

In various embodiments, system 100 may comprise a repository 110, which may store inputs 111. Inputs 111 may comprise data configured to be input into scan system 150 for processing to identify PII. Therefore, repository 110 may be in electronic communication with scan system 150. In various embodiments, repository 110 may comprise hardware and/or software capable of storing data and/or analyzing information. Repository 110 may comprise a server appliance running a suitable server operating system (e.g., MICROSOFT INTERNET INFORMATION SERVICES or, "IIS") and having database software (e.g., ORACLE) installed thereon. In various embodiments, repository 110 may be one database comprising all inputs 111, or multiple databases each storing one or more of inputs 111. In such embodiments, the databases may be comprised in the same repository 110, or in separate locations.

In various embodiments, repository 110 may comprise various inputs 111, including a physical data model 112 and a logical data model 114. Physical data model 112 and/or logical data model 114 may be associated with an entity. The physical data model 112 and the logical data model 114 for an entity may be complementary, in that they may interact to allow the reading and processing of the entity information comprised within physical data model 112 and logical data model 114.

Physical data model 112 may comprise entity information associated with an entity, along with information on how and where the entity information is stored in a physical location. For example, an entity may be in more than one geographic location. Therefore, physical data model 112 may comprise entity information associated with every geographic location of the entity, along with information of how the entity information for each geographic location of the entity is stored, and where (i.e., the physical location of the database). Entity information may be stored in repository 110 with a database instance associated with the entity information as a property on the entity's data dictionary. For example, the database instance may be an inventory identifier, as described below. In various embodiments, physical data model 112 may comprise a physical data table for each geographic location comprising the associated entity information.

Logical data model 114 may interact with physical data model 112 by comprising data indicating the relationship and interaction between different pieces of entity information within physical data model 112 and/or logical data model 114. In other words, each piece of information in logical data model 114 may be associated with at least one piece of information in physical data model 112, or vice versa. Additionally, information in logical data model 114 may show the association between multiple pieces of information in physical data model 112. Relationships and/or interactions between information may be established, for instance, by identifying an entity identifier, and associating information sharing the entity identifier (e.g., locating an identity and a home address for an employee (the entity), because the identity and home address information are associated with the same entity identifier, such as a social security number). As a further example, the logical data model 114 for the entity having multiple geographic locations may provide data showing the relationship between the entity's various locations, addresses, phone numbers, and like, along with the respective physical data tables within physical data model 112. As a specific example of the foregoing, logical data model 114 may comprise entity information for a construction company, which can be linked to two physical data tables in physical data model 112: one for a U.S. location, and the other for a European location. The logical data model 114 may indicate that information associated with the U.S. location may be linked to information associated with the European location. Therefore, by utilizing physical data model 112 and logical data model 114, as system 100 identifies PII for a first physical data table in physical data model 112 (e.g., for the U.S. location), system 100 may also identify PII in physical data tables associated with the first physical data table (e.g., for the European location) based on the information provided by logical data model 114. As yet another example, logical data model 114 may provide data indicating the use for certain entity information in physical data model 112 (e.g., use a certain address for billing or marketing, apply a certain billing rate to a certain geographic location, or the like).

Entity information may comprise information about the associated entity, such as an entity identifier (e.g., an entity name, identification number, symbol, or any other identifier that is unique to the entity to identify it), a physical address, electronic mail address, phone number, or like, as well as characteristics of the entity, such as demographic information, types of goods/services sold, agreements with other entities (e.g., for billing or marketing purposes), record of charge, or the like.

In various embodiments, repository 110 may comprise inventory identifiers 116. Each data model (e.g., physical data model 112 and/or logical data model 114), or each piece of data within a data model, may have an associated inventory identifier, which may be comprised in or attached to the data or data model (e.g., as a property or simple tag of the data or data model). An inventory identifier may be associated with an entity, and indicate the entity to which the data or data model belongs and/or the physical location of the entity. Therefore, every piece of data in a data model belonging to an entity may have the same inventory identifier.

In various embodiments, repository 110 may comprise a standard data bank 118 comprising established PII (i.e., PII that is known or has been previously determined to be associated with an entity). The established PII may be provided to repository 110 by manually determining established PII, and/or from previous iterations of a system, such as system 100, identifying PII. The established PII comprised in standard data bank 118 may serve to provide a standard to which data and/or data models comprised in physical data model 112 and/or logical data model 114 are compared to validate such data, as described further herein.

In various embodiments, system 100 may comprise a scan system 150. Scan system 150 may be in electronic communication with repository 110, and may be configured to receive one or more inputs 111 transmitted from repository for processing. In various embodiments, scan system 150 may comprise hardware and/or software capable of storing data and/or analyzing information. Scan system 150 may comprise a server appliance running a suitable server operating system (e.g., MICROSOFT INTERNET INFORMATION SERVICES or, "IIS") and having database software (e.g., ORACLE) installed thereon.

In various embodiments, scan system 150 may comprise a smart scan engine 153 and a rules engine 157. Smart scan engine 153 may be configured to receive inputs 111 from repository 150 and scan (i.e., process or analyze) the data and/or data models within physical data model 112 and/or logical data model 114. Based on rules provided by rules engine 157, smart scan engine 153 may scan the data and/or data models within physical data model 112 and/or logical data model 114 to identify pieces of data to be considered PII. Rules engine 157 may be configured to provide rules to smart scan engine 153 that instruct scan system 150 how to determine which pieces of data within physical data model 112 and/or logical data model 114 will be identified as PII. For example, rules engine 157 may provide rules for identifying which information of the entity information is PII. For example, rules engine 157 may instruct smart scan engine 153 to identify as PII the information that resembles an entity identifier (e.g., a name, identification number, or any other indicator of the entity's identity), a physical address, an electronic mail address, or any other entity information that could be used to identify the associated entity. In various embodiments, smart scan engine 153 may identify PII by comparing the data and/or data models with established PII from standard data bank 118. In response to a piece of data matching a piece of established PII, smart scan engine 153 may identify the data as PII. Rules engine 157 may likewise provide rules not to identify information as PII that does not identify the entity, such as a zip code, the types of goods and/or services sold, or the like, because those pieces of data would not likely specifically identify the associated entity.

In various embodiments, as discussed herein, smart scan engine 153 may scan the data and data models in physical data model 112 and/or logical data model 114, and identify information as PII based on the rules provided by rules engine 157. Some information identified as PII may be primary PII, and other information identified as PII may be secondary PII. Primary PII may be a piece of unique information to the associated entity that may specifically identify the entity (e.g., an entity identifier or a physical address, or any entity information specifically related to an entity identifier). Secondary PII may be entity information, which, by itself, may not specifically identify the associated entity. Secondary PII may comprise, for example, an entity's zip code, the types of goods and/or services sold, or an individual's gender, ethnicity, etc. While secondary PII may not be able to identify the entity with which the secondary PII is associated, pieces of secondary PII information may be compiled with other pieces of secondary PII and/or primary PII, which in conjunction, may specifically identify the associated entity. Therefore, secondary PII is corroborative information, which may corroborate the identification of an entity, or a compilation of secondary PII (and primary PII) may provide a collective identifier or signature for an entity (e.g., it may be possible to specifically identify an entity, such as an individual, should the individual's zip code, gender, ethnicity, age, and/or other secondary PII be compiled, whereas one or two pieces of secondary PII may not be enough to identify the entity, and therefore, would not be enough to form a collective identifier or signature).

The established PII in standard data bank 118 may be classified as primary PII or secondary PII. Therefore, in response to a piece of data from a data model (physical data model 112 and/or logical data model 114) matching a piece of established PII, the classification of the matched piece of established PII will determine whether the piece of data from the data model is identified and/or determined to be primary or secondary PII by smart scan engine 153.

In various embodiments, smart scan engine 153 may be configured to validate data and/or data models of physical data model 112 and/or logical data model 114 that have been identified as PII ("identified PII"). To validate the identified PII data, smart scan engine 153 may compare the identified PII with the established PII provided to scan system 150 by standard data bank 118. In response to a piece of identified PII from physical data model 112 and/or logical data model 114 matching a piece of established PII from standard data bank 118, smart scan engine 153 may validate such identified PII data ("validated PII"). In response to a piece of identified PII differing from established PII from standard data bank 118, system 100 may re-scan such identified PII through smart scan engine 153 to determine if the data was appropriately identified as PII, or allow manual verification by an operator of system 100.

In various embodiments, in response to a piece of identified PII (e.g., an entity identifier) differing from established PII from standard data bank 118, system 100 may be configured to recognize that the identified PII is another name or label for the corresponding established PII. For example, a piece of identified PII may be marked as an entity identifier or a physical address, or the like, and if compared with the established PII, may not match the corresponding established entity identifier or physical address. For example, in a physical data model 112 associated with an entity, the entity identifier (which would be identified as PII by smart scan engine 153) may be different than the entity identifier stored in standard data bank 118 as established PII for that entity. Therefore, smart scan engine 153 may detect that the differing entity identifier is another name or label for the entity and the entity identifier in the established PII. In response, smart scan engine 153 may add the differing entity identifier to standard data bank 118 associated with the entity and established entity identifier, making the differing entity identifier into a piece of established PII associated with the entity. In various embodiments, continuing the above example, in order for the differing entity identifier identified by smart scan engine 153 to be added to standard data bank 118 as established PII, smart scan engine 153 may validate that the differing entity identifier is in fact an entity identifier for the associated entity and data model. Such validation may also occur manually.

In various embodiments, the identified PII that differs from established PII in standard data bank 118 may be recognized by smart scan engine 153 as another name or label for a piece of established PII because other identified PII associated with the differing PII may match the established PII associated with the entity. Continuing with the example involving the entity identifier in the identified PII from a physical data model 112 differing from the established PII entity identifier, smart scan engine 153 may nonetheless match other identified PII with other established PII associated with the entity. The matching of other identified PII (associated with the differing PII) with other established PII in standard data bank 118 (still without a match between the identified entity identifier and the established entity identifier) may indicate to smart scan engine 153 that the differing PII is the entity identifier associated with all the other identified PII. This shows that a compilation of secondary PII and/or primary PII may help corroborate the identification of an entity or its associated PII, as discussed above.

In various embodiments, data and/or data models identified and/or validated by smart scan engine 153 as being PII may be marked by smart scan engine 153 with a PII marker to indicate that such data has been confirmed as PII (i.e., "PII-marked" data). Accordingly, part of the output 180 of system 100 may comprise a PII-marked physical data model 182 and/or PII-marked logical data model 184. Such PII-marked data models indicate that the data models comprise PII. In various embodiments, data processed and marked as PII by smart scan engine 153 may be maintained and/or secured by preventing or limiting access and/or changes to the data processed and/or marked. Therefore, markings on data and/or data models indicating the presence of PII may not be unintentionally or unnecessarily removed.

In various embodiments, smart scan engine 153 may be configured to provide explanations comprising the reasons for identifying and/or marking data as PII. For example, an entity utilizing system 100 to scan its physical data model 112 and/or logical data model 114 may provide instructions not to mark certain data as PII that would normally be considered PII because the entity does not need to be concerned about such data. Similarly, an entity may provide instructions to mark certain data as PII that otherwise would not be considered PII to mitigate risk and be over-inclusive in identifying PII. Such instructions would be implemented in rules provided by rules engine 157, and smart scan engine 153 may identify data as PII based on the rules. Therefore, to provide a record of the reasons for identifying data as PII, smart scan engine 153 may produce a PII identification explanation 186 in output the 180. There may be one or more PII identification explanations 186 associated with PII-marked physical data model 182 and/or PII-marked logical data model 184 explaining why PII-marked data is marked as such.

In various embodiments, output 180 may also comprise a data model breakdown 188, which may display the percentage of entity information marked as PII per area or department within the entity. For example, data model breakdown 188 may show the percentage of entity information marked as PII within marketing information, billing information, digital acquisition, customer information, promotional program information, or the like. That way, the entity may know where to focus its resources in providing greater PII protection.

In various embodiments, output 180 may be in communication with scan system 150 and/or web client 120. In various embodiments, output 180 may comprise hardware and/or software capable of storing data and/or analyzing information. Output 180 may comprise a server appliance running a suitable server operating system (e.g., MICROSOFT INTERNET INFORMATION SERVICES or, "IIS") and having database software (e.g., ORACLE) installed thereon. In various embodiments, output 180 may be comprised in scan system 150.

In various embodiments, output 180 may be transmitted to the entity utilizing system 100 so that the entity can view which data is PII, and take the appropriate steps to protect such PII. The entity may receive output 180 on a web client 120, and process the entity information, including PII-marked data. For example, the entity may encrypt the PII-marked data to make sure, if there is some sort of data breach, the entity's risk is reduced because the PII is protected through encryption. In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with a network (e.g., a personal computer, personal digital assistant (e.g., IPHONE®, BLACKBERRY®), tablet, cellular phone, kiosk, and/or the like). Web client 120 may be in electronic communication with output 180 and/or scan system 150.

Web client 120 includes any device (e.g., personal computer, mobile device, etc.) which communicates via any network, for example such as those discussed herein. In various embodiments, web client 120 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the interne. For example, the browser may communicate with server 180 via network by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, browser may be configured to display an electronic channel.

Figure 2:
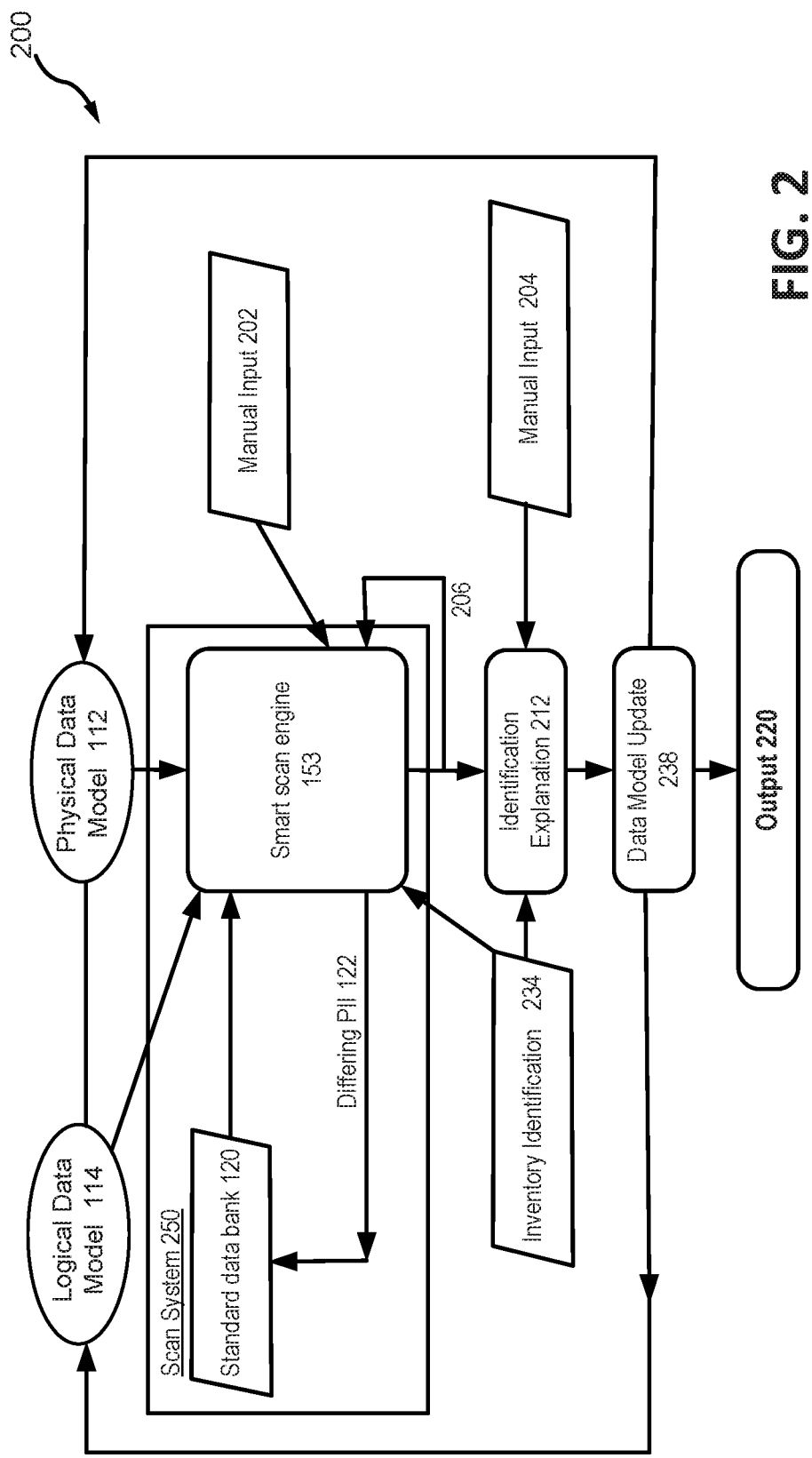
FIG. 2 shows an exemplary processing system for identifying PII, in accordance with various embodiments.
Figure 3:
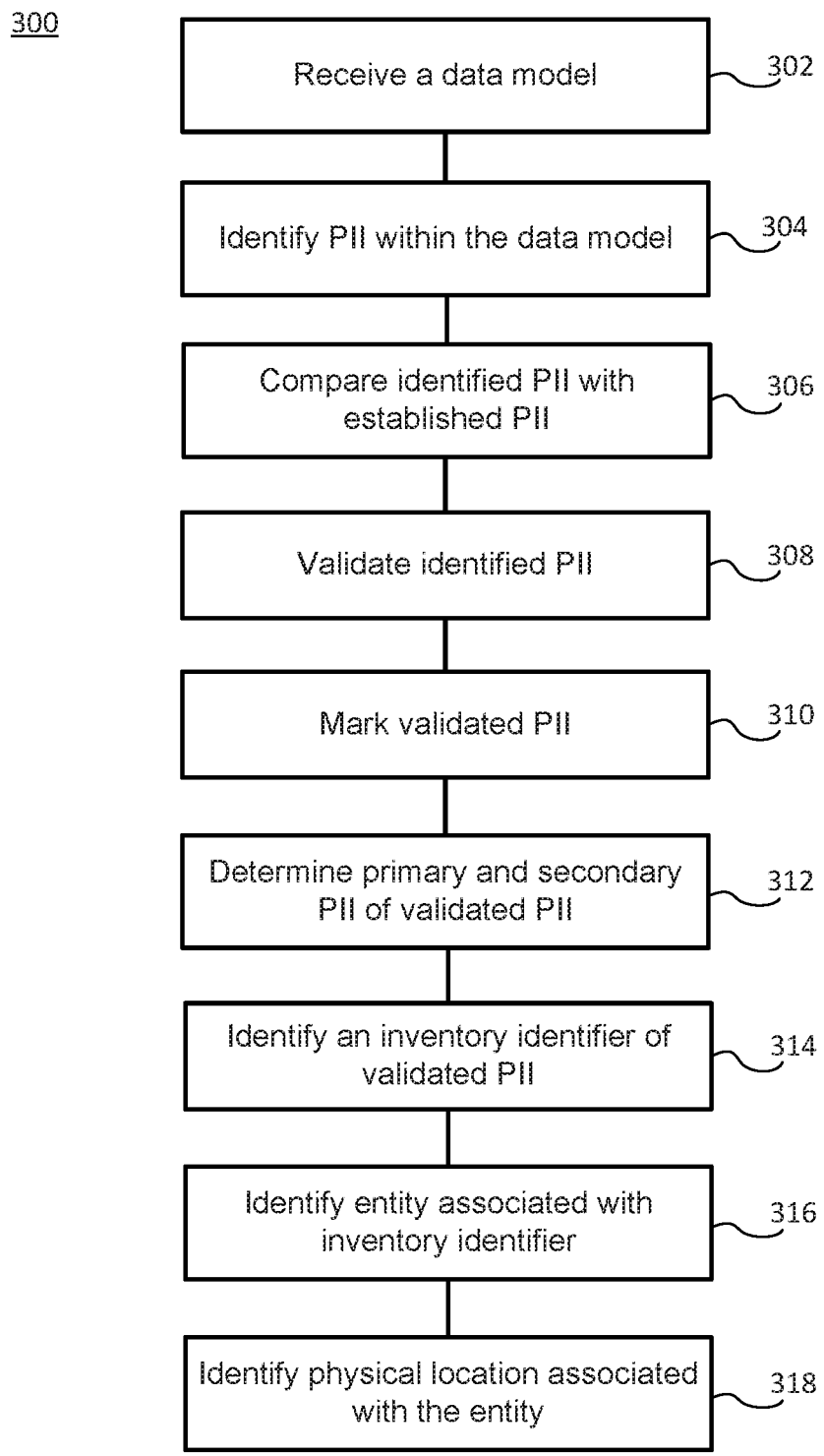
FIG. 3 shows a flowchart depicting an exemplary method for identifying PII using a PII identification system, in accordance with various embodiments.
Figure 4:
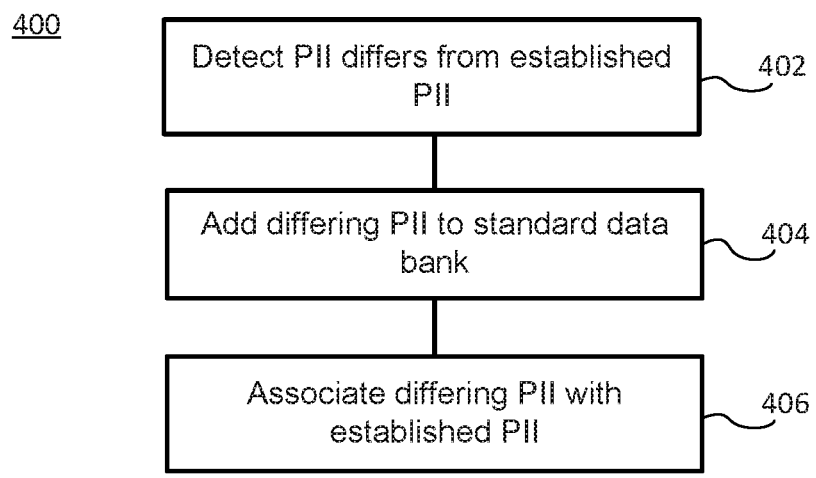
FIG. 4 shows a flowchart depicting an exemplary method for updating a standard data bank comprising established PII, in accordance with various embodiments.

Referring now to FIGS. 3-4 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3-4, but also to the various system components as described above with reference to FIGS. 1 and 2.

FIG. 3 depicts an exemplary method 300 for identifying PII, in accordance with various embodiments. Method 300 show in FIG. 3 may be implemented by system 100 in FIG. 1 and/or an exemplary processing system 200 for identifying PII depicted in FIG. 2. With combined reference to FIGS. 1-3, method 300 may comprise scan system 250 (an example of smart scan system 150 depicted in FIG. 1) receiving a data model (e.g., physical data model 112 and/or logical data model 114) (step 302) from a repository 110 or other data source. As discussed herein, physical data model 112 and/or logical data model 114 may be associated with an entity. Physical data model 112 may comprise entity information about the associated entity, while logical data model 114 may comprise data and/or information indicating the interaction and relationship between pieces of entity information. For example, logical data model 114 may comprise information showing the relationship between pieces of entity information associated with an entity's multiple physical locations, phone numbers, billing processes, or the like (e.g., information indicating that a first physical location of the entity is associated with a first phone number, and that physical location is billed monthly by a third party).

In various embodiments, scan system 250 may identify PII within the data model (step 304) (e.g., physical data model 112 and/or logical data model 114) via smart scan engine 153 scanning the entity information within the data model. Smart scan engine 153 may identify PII based on processing rules provided by a rules engine 157. For example, smart scan engine 153 receive processing rules instructing smart scan engine 153 to identify pieces of entity information comprising certain characteristics (e.g., identify entity information resembling an entity identifier, phone number, or any other characteristic of an entity that resembles PII). Based on such processing rules, smart scan engine 153 may identify PII within the model, or entity information that resembles PII ("identified PII").

In various embodiments, scan system 250 may receive a standard data bank 118 comprising established PII. In various embodiments, scan system 250 may receive and store standard data bank 118, or may receive established PII from standard data bank 118 without receiving and/or storing standard data bank 118. Established PII may be entity information that has been confirmed as PII associated with a respective entity in the previous processing of data models by system 100 and/or 200. Smart scan engine 153 may compare identified PII with established PII (step 306) from standard data bank 118 in an attempt to validate the identified PII. In response to the identified PII matching the established PII, scan system 250 may validate the identified PII (Step 308), producing validated PII.

The validated PII may be manipulated by a manual input 202 in which the validated PII is confirmed or rejected as PII. Manual input 202 may be applied by an operator of scan system 200. In various embodiments, manual input 202 may apply additional rules dictating which information should or should not be identified and/or validated PII. For example, if smart scan engine 153 includes or omits a piece of information as identified or validated PII, manual input 202 may correct such a mistake. Validated PII may be verified any suitable number of times by iterations 206, in which smart scan engine 153 and/or manual input 202 re-scans the data from the data models and verifies the validated PII.

With momentary reference to FIGS. 1, 2, and 4, FIG. 4 depicts a method 400 for updating standard data bank 118, in accordance with various embodiments. In response to smart scan engine 153 comparing the identified PII with established PII from standard data bank 118 (step 306), the identified PII may differ from the established PII. In such a case, smart scan engine 153 may detect that the identified PII differs from the established PII (step 402) (the differing piece of identified PII may be referred to as "differing PII"). For example, smart scan engine 153 may recognize that the piece of identified PII that is an entity identifier does not match the entity identifier in the established PII. In various embodiments, smart scan engine 153 may recognize that the differing PII is another name or label for a piece of established PII because other identified PII associated with the differing PII may match the established PII associated with the entity. For example, the entity identifier of the identified PII may not match the entity identifier of the established PII, but other pieces of the identified PII associated with the differing PII may match the corresponding established PII (e.g., a physical address, phone number, or other entity information). Therefore, smart scan engine 153 may recognize that the differing PII may be the entity identifier, though a different name or label than the entity identifier of the established PII, because all of the other identified PII match the established PII associated with the established entity identifier.

In response to identified PII differing from established PII, and smart scan 153 recognizing the differing PII as another name or label to a corresponding piece of established PII, scan system 250 and/or smart scan engine 153 may add the differing PII 122 to standard data bank 118 (step 404). Scan system 250 and/or smart scan engine 153 may associate the newly added differing PII 122 to the corresponding established PII (step 406) in standard data bank 118. Therefore, if the same piece of identified PII (the differing PII) is identified in subsequent scans by scan system 250, such identified PII may not differ from the established PII because that PII that had previously differed from the established PII is now a part of the established PII in standard data bank 118.

Resuming reference to FIGS. 1-3, validated PII may be marked with a PII marker (step 310) by scan system 250 and/or smart scan engine 153 to indicate that such marked information is validated PII. In various embodiments, the PII marker may be automatically added as a data property or tag to identified or validated PII by smart scan engine 153.

In various embodiments, smart scan engine 153 may determine which PII of the validated PII is primary PII and secondary PII (step 312). As discussed herein, primary PII may be a piece of information unique to the associated entity that may specifically identify the entity (e.g., an entity identifier or a physical address, or any entity information specifically related to an entity identifier). Secondary PII may be entity information, which, by itself, may not specifically identify the associated entity. Secondary PII may comprise, for example, an entity's zip code, the types of goods and/or services sold, or an individual's gender, ethnicity. Primary and secondary PII may be identified by smart scan engine 153 because an entity looking to protect PII in its possession may implement different methods or degrees of protection (e.g., encryption) between primary and secondary PII. For example, primary PII may be given greater protection than secondary PII because primary PII specifically identifies the associated entity.

In various embodiments, smart scan engine 153 may identify an inventory identifier associated with validated PII (step 314). Each data model (e.g., physical data model 112 and/or logical data model 114) or piece of data within a data model may comprise an inventory identifier associated with it. The inventory identifier may be associated with the entity to which the data or data model belongs, and therefore, the inventory identifier may allow identification of the entity owning the associated data. Therefore, inventory identification 234 in system 200 may take place, and smart scan engine 153 may identify an inventory identifier associated with the validated PII (step 314). By the identification of the inventory identifier, smart scan engine 153 may identify the entity associated with the inventory identifier (step 316). Physical data model 112 and/or logical data model 114 may further comprise information about how and where the entity information is stored. Therefore, scan system 250 may be able to identify the physical location of the entity information (step 318) based on the inventory identifier, physical data model 112, and/or logical data model 114.

In various embodiments, system and 200 may collect identification explanations 212 (an example of PII identification explanation 186 in FIG. 1) for validated PII. In various embodiments, smart scan engine 153 may provide or receive identification explanations 212 associated with validated PII, or another system or engine may provide identification explanations 212. Identification explanations 212 may be information associated with validated PII that explains why each or some piece of validated PII was identified and confirmed as PII. For example, an entity utilizing system 200 to scan its physical data model 112 and/or logical data model 114 may provide instructions not to mark certain data as PII that would normally be considered PII because the entity does not need to worry about such data, or to mark certain data as PII that otherwise would not be considered PII to mitigate risk and be over-inclusive in protecting PII. Explanations of such instructions would be provided in identification explanation 212. Additionally, manual input 204 may allow the manual provision of further explanations why certain information was or was not identified as PII.

In various embodiments, a data model update 238 may occur to logical data model 114 and/or physical data model

112. Data model update 238 may comprise information reflecting manual inputs 202 and 204 such that logical data model 114 may mark and recognize relevant data within the data model for identifying PII. Stated another way, data model update 238 may provide updated instructions on the relationship between data in physical data model 112 and/or logical data model 114, such that scan system 250 may more accurately identify PII within the data models (e.g., by automatically implementing manual input 202 and 204 in subsequent scans of a data model for an associated entity).

In various embodiments, system 200 (e.g., scan system 250) may create an output 220 (such as output 180 in FIG. 1) comprising the validated PII, associated inventory identifiers, and/or identification explanations 212 to provide to entities utilizing and/or protecting the PII. As discussed herein, output 220 may be sent to a web client 120 (depicted in FIG. 1) for viewing and manipulation by the entity to use the information.

The disclosure and claims do not describe only a particular outcome of scanning data to identify PII, but the disclosure and claims include specific rules for implementing the outcome of identifying PII and that render information into a specific format that is then used and applied to create the desired results of PII identification, as set forth in *McRO, Inc. v. Bandai Namco Games America Inc.* (Fed. Cir. case number 15-1080, Sep. 13, 2016). In other words, the outcome of identifying PII can be performed by many different types of rules and combinations of rules, and this disclosure includes various embodiments with specific rules. While the absence of complete preemption may not guarantee that a claim is eligible, the disclosure does not sufficiently preempt the field of PII identification at all. The disclosure acts to narrow, confine, and otherwise tie down the disclosure so as not to cover the general abstract idea of just identifying PII. Significantly, other systems and methods exist for PII identification, so it would be inappropriate to assert that the claimed invention preempts the field or monopolizes the basic tools for PII identification. In other words, the disclosure will not prevent others from identifying PII, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information (e.g., PII within a data model) can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information (e.g., identification of PII) of an underlying window (e.g., on web client 120) to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a data model and (ii) an inventory identifier. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

Practitioners will appreciate that web client 120 may or may not be in direct contact with an application server. For example, web client 120 may access the services of an application server through another server and/or hardware component, which may have a direct or indirect connection to an Internet server. For example, web client 120 may communicate with an application server via a load balancer. In various embodiments, access is through a network or the Internet through a commercially-available web-browser software package.

As those skilled in the art will appreciate, web client 120 includes an operating system (e.g., WINDOWS®/CE/Mobile, OS2, UNIX®, LINUX®, SOLARIS®, MacOS, etc.) as well as various conventional support software and drivers typically associated with computers. Web client 120 may include any suitable personal computer, network computer, workstation, personal digital assistant, cellular phone, smart phone, minicomputer, mainframe or the like. Web client 120 can be in a home or business environment with access to a network. In various embodiments, access is through a network or the Internet through a commercially available web-browser software package. Web client 120 may implement security protocols such as Secure Sockets Layer (SSL) and Transport Layer Security (TLS). Web client 120 may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of web client 120 may be further equipped with an Internet browser connected to the Internet or an intranet using standard dial-up, cable, DSL or any other Internet protocol known in the art. Transactions originating at web client 120 may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a My SQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification.

The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

What is claimed is:

1. A method, comprising:
    identifying, by a processor, personally identifiable information (PII) within a data model based on processing rules, to create identified PII, wherein the data model comprises entity information about an entity;
    comparing, by the processor, the identified PII with established PII in a data bank;
    validating, by the processor, the identified PII in response to the identified PII matching the established PII, to create validated PII;
    marking, by the processor, the validated PII with a PII marker in response to the validating the identified PII;
    detecting, by the processor, that the identified PII is different than the established PII to create differing PII;
    adding, by the processor, the differing PII to the data bank; and
    associating, by the processor, the differing PII with the established PII.

2. The method of claim 1, further comprising:
    identifying, by the processor, an inventory identifier associated with each piece of PII of the validated PII; and
    identifying, by the processor, the entity associated with the inventory identifier.

3. The method of claim 1:
    wherein the data model comprises at least one of a physical data model or a logical data model,
    wherein the physical data model comprises the entity information and storage information describing how the entity information is stored and in what location, and
    wherein the logical data model comprises relational information describing an interaction and a relationship between pieces of entity information within the entity information.

4. The method of claim 3, further comprising identifying, by the processor, a physical location associated with the entity in the physical data model.

5. The method of claim 1:
    wherein the data bank comprises primary PII and secondary PII within the established PII,
    wherein primary PII comprises unique information associated with the entity, and
    wherein secondary PII comprises corroborative information associated with the entity.

6. The method of claim 5, further comprising determining, by the processor, which pieces of the validated PII are the primary PII and which pieces of the information are the secondary PII.

7. An article of manufacture including a non-transitory, tangible computer readable storage medium having instructions stored thereon that, in response to execution by a processor of a processing machine, cause the processor to perform operations comprising:
    identifying, by the processor, personally identifiable information (PII) within a data model based on processing rules, to create identified PII,
    wherein the data model comprises entity information about an entity;
    comparing, by the processor, the identified PII with established PII in a data bank;
    validating, by the processor, the identified PII in response to the identified PII matching the established PII, to create validated PII;
    marking, by the processor, the validated PII with a PII marker in response to the validating the identified PII
    detecting, by the processor, that the identified PII is different than the established PII to create differing PII;
    adding, by the processor, the differing PII to the data bank; and
    associating, by the processor, the differing PII with the established PII.

8. The article of claim 7, wherein the operations further comprise:
    identifying, by the processor, an inventory identifier associated with each piece of PII of the validated PII; and
    identifying, by the processor, the entity associated with the inventory identifier.

9. The article of claim 7:
    wherein the data model comprises at least one of a physical data model or a logical data model,
    wherein the physical data model comprises the entity information and storage information describing how the entity information is stored and in what location, and
    wherein the logical data model comprises relational information describing an interaction and a relationship between pieces of entity information within the entity information.

10. The article of claim 9, wherein the operations further comprise identifying, by the processor, a physical location associated with the entity in the physical data model.

11. The article of claim 7:
    wherein the data bank comprises primary PII and secondary PII within the established PII,
    wherein primary PII comprises unique information associated with the entity, and wherein secondary PII comprises corroborative information associated with the entity.

12. The article of claim 11, wherein the operations further comprise determining, by the processor, which pieces of the validated PII are the primary PII and which pieces of the information are the secondary PII.

13. A system comprising:
a processor of a processing machine,
a tangible, non-transitory memory configured to communicate with the processor,
the tangible, non-transitory memory having instructions stored thereon that, in response to execution by the processor, cause the processor to perform operations comprising:
identifying, by the processor, personally identifiable information (PII) within a data model based on processing rules, to create identified PII,
wherein the data model comprises entity information about an entity;
comparing, by the processor, the identified PII with established PII in a data bank;
validating, by the processor, the identified PII in response to the identified PII matching the established PII, to create validated PII;
marking, by the processor, the validated PII with a PII marker in response to the validating the identified PII;
detecting, by the processor, that the identified PII is different than the established PII to create differing PII;
adding, by the processor, the differing PII to the data bank; and
associating, by the processor, the differing PII with the established PII.

14. The system of claim 13 wherein the operations further comprise:
identifying, by the processor, an inventory identifier associated with each piece of PII of the validated PII; and
identifying, by the processor, the entity associated with the inventory identifier.

15. The system of claim 13, wherein the operations further comprise identifying, by the processor, a physical location associated with the entity in the data model.

16. The system of claim 13:
wherein the data bank comprises primary PII and secondary PII within the established PII,
wherein primary PII comprises unique information associated with the entity, and wherein secondary PII comprises corroborative information associated with the entity.

17. The system of claim 16, wherein the operations further comprise determining, by the processor, which pieces of the validated PII are the primary PII and which pieces of the information are the secondary PII.

* * * * *